(12) United States Patent  (10) Patent No.: US 7,057,356 B2
Johnsen et al.  (45) Date of Patent: Jun. 6, 2006

(54) HIGH INTENSITY DISCHARGE LAMP WITH BOOST CIRCUIT

(75) Inventors: Andrew O. Johnsen, Danvers, MA (US); Bernhard Ertl, Munich (DE); Guy P. Bouchard, Beverly, MA (US); Arnulf Rupp, Taufkirchen (DE)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 10/985,555

(22) Filed: Nov. 10, 2004

(65) Prior Publication Data

US 2006/0097663 A1  May 11, 2006

(51) Int. Cl.
*H05B 37/02* (2006.01)
*G05F 1/00* (2006.01)

(52) U.S. Cl. ................... 315/209 R; 315/291; 315/307; 315/308

(58) Field of Classification Search ................ 315/209, 315/212, 291, 310, 307, 308
See application file for complete search history.

(56) References Cited

U.S. PATENT DOCUMENTS

| | | | |
|---|---|---|---|
| 4,170,747 A | 10/1979 | Holmes ...................... 315/307 |
| 4,912,374 A | 3/1990 | Nagase et al. .............. 315/244 |
| 5,668,712 A * | 9/1997 | Cassese et al. ............... 363/95 |
| 5,962,988 A * | 10/1999 | Nuckolls et al. ............ 315/291 |
| 6,034,490 A * | 3/2000 | Yamashita et al. .......... 315/310 |
| 6,188,180 B1 | 2/2001 | Diamond .................... 315/289 |
| 6,288,501 B1 * | 9/2001 | Nakamura et al. .......... 315/307 |
| 6,294,879 B1 * | 9/2001 | Nagase et al. .......... 315/209 R |
| 6,380,694 B1 | 4/2002 | Uchihashi et al. .......... 315/244 |
| 6,861,812 B1 * | 3/2005 | Kambara et al. ........... 315/291 |
| 2003/0111969 A1 * | 6/2003 | Konishi et al. ............. 315/291 |
| 2004/0251852 A1 * | 12/2004 | Kambara et al. ........... 315/291 |

* cited by examiner

*Primary Examiner*—Tuyet Vo
*Assistant Examiner*—Tung Le
(74) *Attorney, Agent, or Firm*—Carlo S. Bessone

(57) ABSTRACT

A circuit for operating a high intensity discharge (HID) lamp includes an H-bridge connected between a common terminal and a power line, and a control circuit connected to the H-bridge. A boost circuit is connected in parallel with the H-bridge between the power line and the common terminal, where the boost circuit includes a resistor, a Zener diode and a capacitor connected in series.

6 Claims, 1 Drawing Sheet

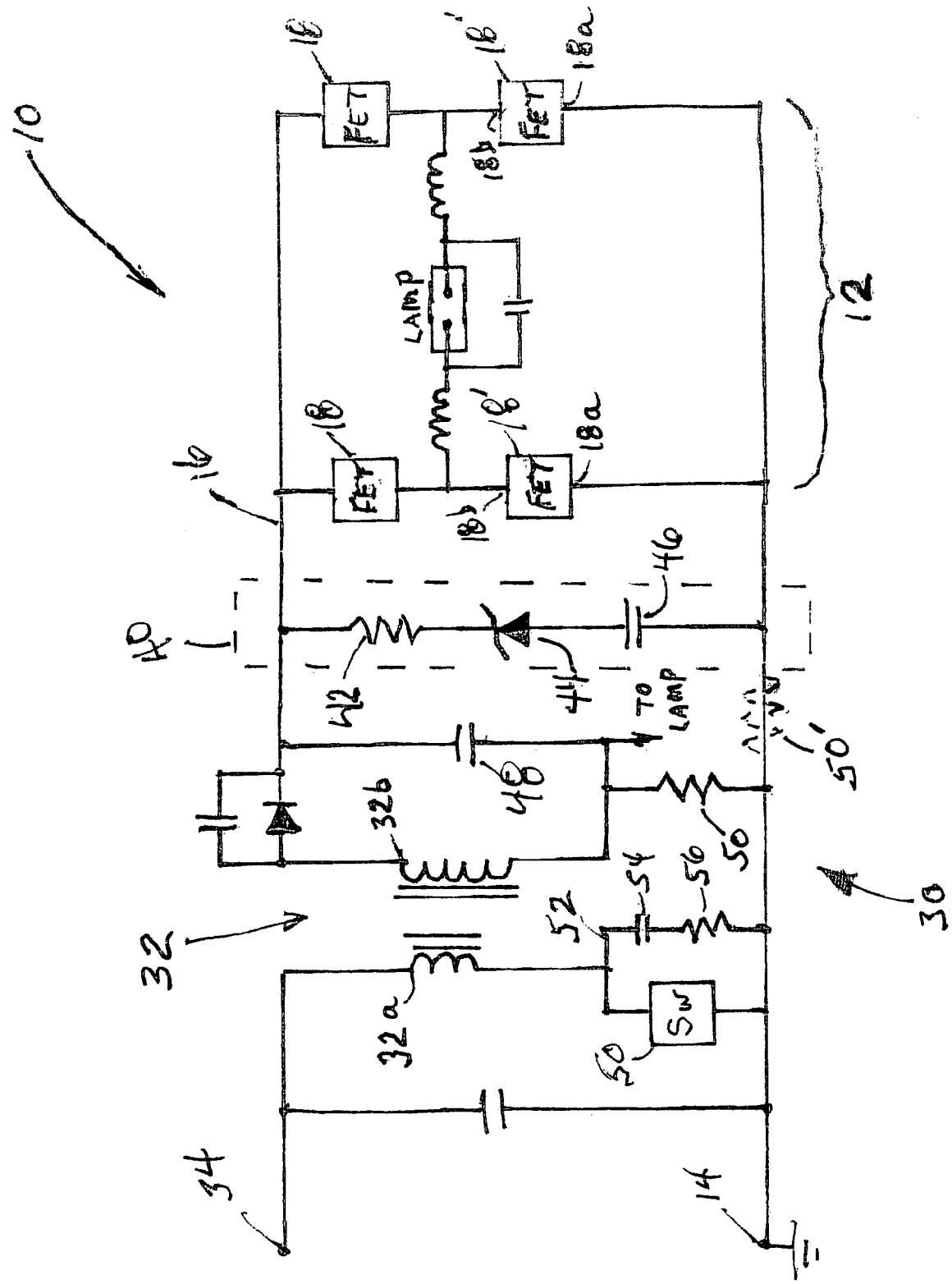

HIGH INTENSITY DISCHARGE LAMP WITH BOOST CIRCUIT

BACKGROUND OF THE INVENTION

The present invention is directed to a circuit for operating a high intensity discharge (HID) lamp. More particularly, the circuit is for automotive lamp applications.

HID lamps may have a boost circuit that provides additional energy during lamp starting. The purpose of the boost circuit is to take the lamp through a transition from glow to arc after firing the igniter.

SUMMARY OF THE INVENTION

An object of the present invention is to provide a novel circuit for operating a HID lamp. The circuit includes an H-bridge connected between a common terminal (e.g., ground) and a power line, and a control circuit connected to the H-bridge. A boost circuit is connected in parallel with the H-bridge between the power line and the common terminal. The boost circuit includes a resistor, a Zener diode and a capacitor connected in series.

BRIEF DESCRIPTION OF THE DRAWING

The FIGURE is a circuit diagram of an embodiment of the circuit of the present invention.

DESCRIPTION OF PREFERRED EMBODIMENTS

An embodiment of the present invention is depicted in the figure. As shown therein, a circuit 10 for operating a HID lamp includes an H-bridge 12 connected between a common terminal 14, such as ground, and a power line 16. The H-bridge 12 has four field effect transistors (FETs) 18, where two of these FETs 18' have a first terminal 18a connected to the common terminal. The H-bridge 12 is connected to the HID lamp 20 at second terminals 18b of these two FETs.

The circuit 10 also includes a control circuit 30 connected to the H-bridge 12. The control circuit 30 may include a transformer 32 having a primary winding 32a connected between the common terminal 14 and a power terminal 34 and a secondary winding 32b connected between the common terminal 14 and the power line 16.

A boost circuit 40 is connected in parallel with the H-bridge 12 between the power line 16 and the common terminal 14. The boost circuit 40 includes a resistor 42, a Zener diode 44 and a capacitor 46 connected in series.

A further capacitor 48 may be connected in parallel with the secondary winding 32b between the power line 16 and the common terminal 14.

In operation, the electrodes of the lamp are initially at a potential difference of, for example, 400 volts. An igniter breaks down the lamp impedance and after the ignition pulse the potential difference decreases. As the potential difference decreases, energy from the further capacitor 48 is dumped to provide more energy to the lamp electrodes. When the voltage drops further, for example below 300 volts, the boost circuit 40 provides further energy from capacitor 46 through diode 44 and resistor 42. The extra energy from capacitor 46 assures that the lamp electrodes will be adequately heated to provide a smooth transition from glow to arc.

It is desirable that capacitor 46 have characteristics so that it charges fast enough so that it is fully charged before lamp ignition and during re-strike. The capacitor 46 also should provide a low impedance path to the lamp at take over and have a high enough impedance to help with re-ignition at each phase transition of the H-bridge. From a practical standpoint, the components should be surface mountable for automated production and have a long shelf life.

A particular embodiment uses a 110 volt Transil™ diode 44, a 10 Ohm resistor 42 and a surface metal foil 1.5 uF capacitor 46. During normal running of the lamp, capacitor 46 voltage floats 110 volts less than the peak lamp voltage at each transition. This assures a fast dv/dt of the lamp voltage for each transition. The surface metal foil capacitor has an extended shelf life (a short, e.g., one year, shelf life is generally not acceptable for automotive applications).

The control circuit 30 may also include a current sense resistor 50, 50'. In a preferred embodiment, the current sense resistor 50 is connected in series between the secondary winding 32b and the common terminal 14. It should be noted that the voltage drop across the current sense resistor 50 is not in the ground path driving the FETs 18 of the H-bridge 12. The current sense resistor 50 monitors the current output of the secondary winding 32b, eliminating or reducing the influence of large boost circuit currents that may be present during lamp starting. Alternatively, as shown in dashed lines the current sense resistor 50' may be connected in series between the common terminal 14 and the first terminal 18a of the two FETs 18'.

The control circuit may also include a switch 50, such as a transistor, connected in series between the primary winding 32a and the common terminal 14 and a further connection 52 connected in parallel with the switch 50 between the primary winding 32a and the common terminal 14, where the further connection includes a capacitor 54 and a resistor 56 connected in series.

While embodiments of the present invention have been described in the foregoing specification and drawings, it is to be understood that the present invention is defined by the following claims when read in light of the specification and drawings.

We claim:

1. A circuit for operating a high intensity discharge (HID) lamp, comprising:
   an H-bridge connected between a common terminal and a power line, said H-bridge having four field effect transistors (FETs), two of said FETs having a first terminal connected to the common terminal, said H-bridge being connected to the HID lamp at second terminals of said two FETs;
   a control circuit connected to said H-bridge, said control circuit comprising a transformer having a primary winding connected between the common terminal and a power terminal and a secondary winding connected between the common terminal and said power line; and
   a boost circuit connected in parallel with said H-bridge between said power line and the common terminal, said boost circuit comprising a resistor, a Zener diode and a first capacitor connected in series.

2. The circuit of claim 1, further comprising a second capacitor connected in parallel with said boost circuit between said power line and the common terminal.

3. The circuit of claim 1, wherein said control circuit comprises a switch connected in series between said primary winding and the common terminal and a further connection connected in parallel with said switch between said primary winding and the common terminal, said further connection having a capacitor and a resistor connected in series.

4. The circuit of claim 1, further comprising a current sense resistor.

5. The circuit of claim 4, wherein said current sense resistor is connected in series between said secondary winding and the common terminal, the HID lamp being connected to the common terminal and to said second winding to sense a current across said current sense resistor.

6. The circuit of claim 4, wherein said current sense resistor is connected in series between the common terminal and said first terminal of said two FETs.

* * * * *